United States Patent
Rumney

(10) Patent No.: US 6,949,904 B2
(45) Date of Patent: Sep. 27, 2005

(54) POWER ACTUATED SEAT

(75) Inventor: Timothy John Rumney, Oakley (GB)

(73) Assignee: Muirhead Aerospace Ltd., London (GB)

( * ) Notice: Subject to any disclaimer, the term of this patent is extended or adjusted under 35 U.S.C. 154(b) by 0 days.

(21) Appl. No.: 10/205,086

(22) Filed: Jul. 24, 2002

(65) Prior Publication Data

US 2003/0080699 A1 May 1, 2003

Related U.S. Application Data

(60) Provisional application No. 60/335,508, filed on Oct. 31, 2001.

(30) Foreign Application Priority Data

Feb. 18, 2002 (GB) .............................. 0203887

(51) Int. Cl.$^7$ ................................. B60N 2/02
(52) U.S. Cl. ..................... 318/565; 318/286; 388/904; 388/909
(58) Field of Search ................................ 318/565, 256, 318/263–266, 286, 466–469; 388/903, 904, 909

(56) References Cited

U.S. PATENT DOCUMENTS

| 4,158,160 | A |   | 6/1979 | Meiller |
| 5,765,916 | A | * | 6/1998 | Patel ..................... 297/344.13 |
| 6,049,748 | A | * | 4/2000 | Newman et al. ............... 701/49 |
| 6,064,165 | A | * | 5/2000 | Boisvert et al. ............ 318/465 |
| 6,243,635 | B1 | * | 6/2001 | Swan et al. ................... 701/49 |
| 6,254,126 | B1 |   | 7/2001 | Bauer et al. |
| 6,255,790 | B1 | * | 7/2001 | Popp et al. ................. 318/280 |
| 6,526,643 | B1 | * | 3/2003 | Renault ................... 29/407.05 |

FOREIGN PATENT DOCUMENTS

| DE | 3428585 | 2/1986 |
| DE | 198 52 541 | 3/2000 |
| DE | 199 47 372 | 4/2001 |
| EP | 0 530 439 A2 | 3/1993 |
| EP | 1147938 B1 | 1/2004 |
| FR | 2 802 634 | 6/2001 |
| WO | WO 00/37899 | 6/2000 |

* cited by examiner

Primary Examiner—Bentsu Ro
(74) Attorney, Agent, or Firm—Perkins Coie LLP

(57) ABSTRACT

Embodiments of the present invention provide methods and apparatus for controlling seats and for monitoring behavior of power-actuated seats. Certain embodiments permit seat occupancy data, e.g., whether the seat is occupied or a weight-dependent characteristic of the occupant of the seat, to be collected by moving a part of the seat with an actuator. This seat occupancy data may then be used to control other aspects of the seat operation, e.g., set an operational limit of the actuator or reduce auxiliary power to other systems associated with the seat if the seat is unoccupied. For example, part of the seat may be moved with a first actuator, including detecting a control parameter at which the part of the seat begins moving. This control parameter may be correlated to an actuator limit.

15 Claims, 4 Drawing Sheets

POWER ACTUATED SEAT

CROSS-REFERENCE TO RELATED APPLICATIONS

The present application claims priority to UK Patent Application No. 0203887.5, filed Feb. 18, 2002, and is a continuation-in-part of copending U.S. Provisional Application No. 60/335,508, filed Oct. 31, 2001.

TECHNICAL FIELD

The present invention provides certain improvements in power-actuated seats. The invention has particular utility in connection with power-actuated seats for use in automobiles, airplanes, trains, and other types of vehicles, though aspects of the invention could be used in non-vehicular applications, as well.

BACKGROUND

Adjustable seats are used in a wide variety of applications, ranging from residential chairs and sofas to driver and passenger seats used in vehicles, such as automobiles, airplanes, and trains. Such seats typically include a seat member and a back, with the position of at least one of these two elements being adjustable. For example, a position of the seat back may be adjustable to reconfigure the seat from an erect seated positioned to a supine reclined position. In some seats, the height and/or angle of the seat member may also be adjusted. Some seats include other adjustable members, e.g., leg rests, headrests, lumbar supports, or the like.

Power-actuated seats are becoming increasingly prevalent, particularly in automobiles and first-class and business-class seating on airplanes. Rather than requiring a user to manually adjust the positions of the elements of the seat, a power-assisted device, such as a mechanical or hydraulic actuator, or a series of such devices, is employed. A passenger may use buttons or control levers, which may be located on a common keyboard or console, to control the power-assisted devices to reconfigure the seat to meet his or her preferences.

The actuators of most power-actuated seats move the relevant member of a seat with the same force, regardless of the weight of the person seated in the seat. Since the force of the actuator must be sufficient to move the relevant seat element for the heaviest passenger, such constant-force actuators must be configured to operate at full force at all times. This can waste electricity and it may cause undue wear and tear on the actuator.

Reducing the force applied by the actuator to a level more commensurate with needs may also enhance safety of a power-actuated seat. For example, a child may inadvertently place one of his legs between the leg rest and the seat member of the seat. If the position of the seat member or the leg rest is adjusted, the child's leg may become pinned between the leg rest and the seat member. With a constant-force actuator, the actuator must move the seat member or the leg rest with sufficient force to move the seat member or leg rest against the weight of the heaviest accommodated passenger. If the force of the actuator were instead reduced to a level more appropriate for a lighter child, the force acting against the child's pinned leg could be reduced, reducing the likelihood of any injury to the child.

Efforts have been made to detect whether a passenger is seated in an automobile seat and disable deployment of an airbag or other supplemental restraint system if an automobile seat is unoccupied or is occupied by a small child. For example, U.S. Pat. No. 5,905,210 (O'Boyle et al.), U.S. Pat. No. 6,058,341 (Myers et al.), and U.S. Pat. No. 6,242,701 (Breed et al.), the teachings of each of which is incorporated herein by reference, all propose separate mechanisms which can be incorporated into an automobile passenger seat to respond to the weight of any passenger occupying the seat. These separate weighing mechanisms incorporated into the seats add weight and cost to the seat.

Some known automobile passenger weighing systems suffer from other drawbacks, as well. For example, some passenger seat weight sensors include one or more pads which employ force sensitive resistive films. The resistance values of most such films will change with temperature and can drift over time with a constant load on the film. Other automotive seats, such as the one proposed by Myers in U.S. Pat. No. 6,058,341, employ inflatable bladders. Operation of such inflatable bladders tends to vary with changes in ambient temperature and pressure. The fluid used to inflate such bladders may leak out or pass through the bladder wall through osmosis, which requires a mechanism for automatically replenishing the fluid within the bladder from time to time.

In aircraft seat applications, weight and electrical power are both at a premium. Airline passengers are coming to expect more and more amenities, particularly in first-class and business-class seating. These amenities include reading lights, video monitors for personal entertainment systems, telephones, and even auxiliary power for laptop computers and the like. If a seat is unoccupied, it may be desirable to disable or reduce the power supplied to the seat to conserve power for other passengers. In theory, passenger seat assignments might provide a framework for determining which seats on an aircraft are unoccupied. If a flight is not full, though, it is common for passengers to move from their initially assigned to seat to a more desirable open seat. There may also be appreciable periods of time when passengers are out of their seats, such as to visit the lavatory, when power to the seat can be shut off or minimized without significantly inconveniencing the passenger.

As noted above, automobile seats have been proposed which include passenger weighing apparatus to detect whether the seat is occupied. Including an entirely separate mechanism, the sole purpose of which is to determine the seat occupancy, can add undesirable weight to the seat. The temperature and pressure variations encountered in aircraft environments can also interfere with use of some of the passenger sensing systems proposed for automobiles, such as inflatable pressure-sensitive bladders.

SUMMARY

In accordance with the different embodiments, the invention provides methods of controlling seats, seat control systems, and methods of monitoring behavior of power-actuated seats. One embodiment of the invention provides a method of controlling a seat which includes moving a seat member of the seat with a first actuator. Moving the seat member includes detecting a control parameter at which the seat member begins moving. The control parameter is correlated to an actuator limit. In further embodiments of the invention, a maximum activation power for the first actuator may be set corresponding to the actuator limit and the seat member may be moved with the first actuator through a range of movement without exceeding the maximum activation power. In another adaptation of this embodiment, the method further includes determining that the seat is unoccupied if the control parameter falls outside an occupancy range.

A seat control system in accordance with another embodiment of the invention includes a system bus and a controller coupled to the system bus. The controller is adapted to initiate movement of the seat member with a first actuator, including detecting a control parameter at which the seat member begins moving. The controller is also adapted to correlate the control parameter to an actuator limit.

Another embodiment of the invention provides a method of controlling a seat which involves moving a seat member of the seat with a first actuator, including detecting a control parameter at which the seat member begins moving. The seat is determined to be unoccupied if the control parameter falls outside an occupancy range. In one adaptation of this embodiment, auxiliary power to the seat is reduced if the seat is determined to be unoccupied.

A control system provided in alternative embodiment of the invention includes a system bus and a controller coupled to the system bus. The controller is adapted to initiate movement of the seat member with a first actuator, including detecting a control parameter at which the seat member begins moving. The controller is also adapted to determine that the seat is unoccupied if the control parameter falls outside an occupancy range.

A method of controlling a seat in accordance still another embodiment of the invention includes increasing activation power supplied to the first actuator from an initial power level in accordance with a ramp profile. While increasing the activation power, a motion indicator correlated to motion of the first actuator is detected. This motion indicator may, in turn, be correlated to a maximum activation power for the first actuator. Detecting the motion indicator may, for example, comprise detecting a deviation of the activation power from the ramp profile or detecting movement of an element of the first actuator.

Still another embodiment of the invention provides a method of monitoring the behavior of a seat having a seat member coupled to an actuator, the actuator being coupled to a power source having a variable power level. In accordance with this method, power is delivered from the power source to the actuator to move the seat member with the actuator. The power level of the power source during movement of the seat member is detected, as is a length of time of movement. Performance data is stored in the memory circuit, with the performance data reflecting the detected power level and time of movement. If the performance data exceeds normal operating parameters, a fault is generated. In one application of this embodiment, this method may be carried out for repeated movement of the seat member with the actuator, with the performance data stored in the memory circuit for the repeated movement comprising collective performance data for the seat. This collective performance data may be used to predict service needs for the seat.

DETAILED DESCRIPTION

Figure 1:
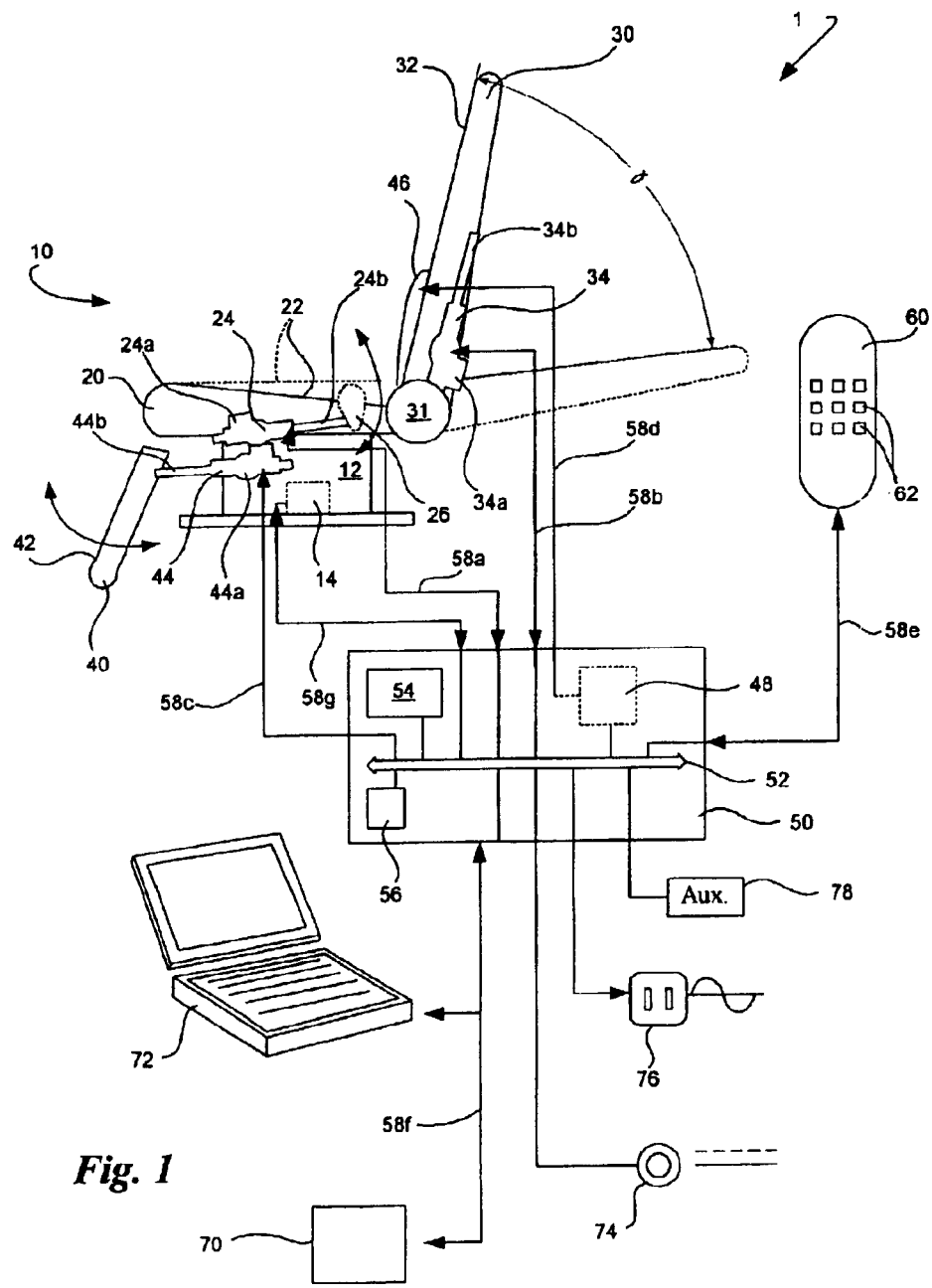
FIG. 1 is a diagram schematically illustrating selected components of a seat system in accordance with one embodiment of the invention.

Various embodiments of the present invention provide methods of controlling seats, seat control systems, and methods of monitoring behavior of power actuated seats. The following description provides specific details of certain embodiments of the invention illustrated in the drawings to provide a thorough understanding of those embodiments. It should be recognized, however, that the present invention can be reflected in additional embodiments and the invention may be practiced without some of the details in the following description.

The seat system 1 of FIG. 1 includes a seat 10 and a control unit 50 associated with the seat 10. The seat 10 shown in FIG. 1 generally includes a base 12, a seat member 20, a back 30, a leg rest 40, and a lumbar support 46. The base 12 may be used to support the seat on a support surface. For example, the base 12 may be used to mount the seat 10 to the floor of a cabin of an aircraft or an automobile. Whereas the control unit 50 is shown as being separate from the seat 10 for purposes of illustration, it is contemplated that the control unit 50 may be carried by the seat, e.g., by being mounted in the base 12 or in an arm rest (not shown).

In the seat 10 of FIG. 1, the seat member 20, the back 30 and the leg rest 40 are all independently movable with respect to the base 12. In other embodiments, fewer elements of the seat 10 are movable with respect to the base 12. For example, the back 30 and the leg rest 40 may remain stationary while only the seat member 20 may move with respect to the base 12. If so desired, the seat 10 may also include other components, e.g., arm rests, which may or may not be movable.

The seat member 20 may be carried by the base 12 in a fashion which allows at least a portion of the seat member 20 to be articulated with respect to the base 12. For example, the entire seat member 20 can be pivotally attached to the base 12 or slidably attached to the base 12 to ride along an inclined runner. In one embodiment, the seat member 20 may include a plastic bottom member, a foam pad, and a fabric cover (not specifically shown). In such a design, the actuator 24 may be attached to the bottom member and be used to move the entire seat member 20 with respect to the base.

Movement of the seat member 20 respect to the base 12 may be effectuated by a mechanical or hydraulic actuator 24. This seat member actuator 24 may take any suitable form. For example, the seat member actuator 24 may include an electrically powered drive motor 24a which rotatably drives an output shaft 24b. An eccentric cam 26 may be carried on the output shaft 24b. By rotating the output shaft 24b and the associated cam 26, the upper surface 22 of the seat member 20 can be a raised or lowered. In one embodiment, a gear reduction is employed between the output shaft 24b and the cam 26 to provide greater mechanical leverage and finer control over the position of the upper surface 22 of the seat member 20. As explained in more detail below, the drive motor 24a can be coupled to the control unit 50 via a power line 58a and the power for the motor 24a can be selectively controlled by the control unit 50. In one embodiment, the maximum force exerted by the seat member actuator 24 to move the upper surface 22 of the seat member 20 is dependent on the power supplied to the seat member actuator 24 via the power line 58a. Such actuators are commercially available from a variety of sources, including Kollmorgen of Radford, Va., United States; Laval of Montigny le Bretonneux, France; and P. L. Porter of Woodland Hills, Calif., United States, for use in their ALPPS airline passenger power system. For example, actuators which are expected to work in this application are available from Kollmorgen as model numbers AS120M12A and VL200125A. Selecting an actuator with high quality components and good seals, for example, can reduce maintenance needs.

The back 30 of the seat may be pivotably attached to a shaft 31 for movement through an angular range of motion α. Generally, the back 30 will be movable between an erect seated position (shown in solid lines in FIG. 1) and a range of supine, reclining positions (one of which is shown in dashed lines in FIG. 1). In one embodiment, the back 30 may be manually moved from one position to another, such as by depressing a button which unlocks a locking pawl. Such manually adjusted seat backs are common in the automotive and aircraft industries. The seat 10 in FIG. 1, however, includes a powered actuator 34 for moving the seat back 30 through the range of motion α. Like the seat member actuator 24, the back actuator 34 may include a drive motor 34a connected to an output shaft 34b. Using an appropriate interface between the actuator 34 and the seat back 30, rotation of the output shaft 34b can translated into rotational movement of the seat back 30 about the axis of the shaft 31. The back actuator 34 can be coupled to the control unit 50 via a second power line 58b, which may be separate from the power line 58a connecting the seat member actuator 24 to the control unit 50.

If so desired, the seat back 30 may include an adjustable lumbar support 46. As is known in the art, such lumbar supports may include inflatable bladders (not shown). By increasing or decreasing the amount of fluid, typically a gas, in the bladders, the size and stiffness of the lumbar support 46 can be adjusted to meet the particular user's needs. The bladders in the lumbar support 46 may be inflated and deflated using an electrically controllable lumbar pump 48. The pump 48 may communicate with the lumbar support 46 via a pneumatic line 58d. The lumbar pump 48 may be operatively connected to a system bus 52 of the control unit 50, described in more detail below, to enable adjustment of the lumbar support 46 with a common controller 50.

The seat 10 of FIG. 1 also includes a leg rest 40 which may be articulated between a retracted position (generally as shown in FIG. 1) and an extended position (not shown) elevating the user's legs, which may rest upon the contact surface 42 of the leg rest 40. In one embodiment, the leg rest is manually moved from one position to another. In the illustrated embodiment, though, the leg rest 40 is moved by a leg rest actuator 44 which includes a drive motor 44a and an output shaft 44b. This leg rest actuator 44 may be similar in construction and operation to the back actuator 34 discussed above. The leg rest actuator 44 may be coupled to the control unit 50 via powerline 58c.

The seat 10 may also be adapted to rotate about a vertical axis. This may be useful, for example, on small passenger jets so passengers can rotate their seats from a forward-facing position for take-off and landing to another orientation to face other passengers for informal discussions. If so desired, a rotational brake 14 may be included in the base 12 to restrict rotation of the seat 10. This brake may communicate with the control unit 50 via a communication line 58g. This permits the seat 10 to be locked against rotation under the control of a global control system 70, discussed below, via the control unit 50.

If so desired, the seat 10 may also include a backup sensor (not shown). This backup sensor may provide a separate means for detecting the presence of a passenger and/or weighing the passenger. For example, the backup sensor may comprise a separate passenger weighing system of the type discussed above in connection with U.S. Pat. Nos. 5,905,210, 6,058,341, and 6,242,701.

As noted above, the seat system 1 illustrated in FIG. 1 also includes a control unit 50 which can be used to control operation of the seat 10. The control unit 50 is shown schematically in FIG. 1 as series of components and power lines operatively connected to a system bus 52. The control unit 50 may also include a controller 54 and one or more memory circuit 56. The controller 54 may comprise a conventional microprocessor and a programmable memory circuit, for example. The control unit 50 may include a separate memory circuit 56, as shown, or the entire memory for the control unit 50 may be incorporated into the controller 54. The controller 54 may be programmed to operate the actuators 24, 34, and 44 and the lumbar pump 48 in response to control signals. The manner of operation of the actuators 24, 34, and 44 in certain embodiments is described in more detail below.

A user, e.g., an occupant of the seat 10, may interface with the control unit 50 to adjust the relative positions of the elements of the seat 10 in any desired fashion. FIG. 1 schematically illustrates a user interface 60 which may communicate with the system bus 52 of the control unit 50 via a communication line 58e. The user interface 60 is shown as having a keypad with a plurality of buttons 62 for controlling various functions of the control unit 50. This same user interface 60 may also be used to control other auxiliary devices 78, such as changing channels on a video monitor or audio system, controlling overhead lighting associated with the seat 10, or other auxiliary devices. The user interface 60 is illustrated as having buttons 62 to control devices coupled to the control unit 50, but any other suitable interface may be employed, such as a touch screen, dials, or voice activation.

The control unit 50 may receive power from a power supply 74. This power supply may be connected to the electrical system of an automobile or the main DC-power grid of an aircraft cabin, for example. Any suitable power source may be employed, though.

If so desired, the control unit 50 may also be connected to an auxiliary power output 76. In the context of an airline seat, for example, such an auxiliary power output may provide an alternating circuit power source for laptops or other AC-powered devices used by a passenger.

The control unit 50 may also include an external communications link 58f to interface the control unit with external systems. For example, the communications link 58f may link the control unit 50 to a global control system 70 of an aircraft, automobile or other vehicle. In one application, this allows an independent operator, such as a flight attendant, to override control of the seat 10 or to monitor operation of the seat 10 from a centralized location. The external communications link 58f may also be used to link the control unit 50 to an external computer 72. Such an external computer 72 may be used to initialize or change the operating parameters of the control unit 50, download data from the memory circuit 56, reprogram the controller 54, or perform any of a variety of other service-related functions.

The controller 54 may be adapted to interface with the actuators 24, 34, and 44 via the system bus 52 and the power lines 58a, 58b, and 58c, respectively. Some embodiments of the invention provide methods wherein the controller 54 controls movement of one of the elements of the seat 10 (e.g., the seat member 20, the back 30, or the leg rest 40) and detect a control parameter at which the element of the seat begins moving. This detected control parameter can then be used to determine seat occupancy data, including whether the seat is occupied and/or some weight-dependent characteristic of the occupant of the seat 10. This movement of an element of the seat for data collection may be accomplished with the same actuator used to change the position of the seat. Such an arrangement allows embodiments of the invention to determine seat occupancy information utilizing equipment already incorporated into the seat 10 rather than requiring the addition of a separate passenger weighing system, such as those discussed above in connection with U.S. Pat. Nos. 5,905,210, 6,058,341, and 6,242,701.

A variety of different elements of the seat 10 could be moved to collect the seat occupancy data. The following discussion will focus on an embodiment of an invention which moves the seat member 20 with the actuator 24 to collect the seat occupancy data. In some circumstances, utilizing the seat member 20 to collect the seat occupancy data may prove more reliable because the seat member 20 will bear a meaningful portion of the passenger's weight regardless of the position of the back 30 or leg rest 40. In contrast, the force exerted by the passenger's weight on the back 30 or leg rest 40 may depend to a larger degree on the passenger's posture and the location of the seat back 30 or leg rest 40 when the seat occupancy data is collected.

In one embodiment of the invention, the controller 54 controls the delivery of electrical power to the drive motor 24a of the seat member actuator 24. As the power is delivered to the actuator 24, the seat system 1 will detect when the seat member 20 begins moving under the force of the actuator 24. This could be done by directly monitoring the position of the upper surface 22 of the seat member 20. In one embodiment of the invention, however, the movement of the seat member 20 is monitored indirectly, such as by monitoring an operational parameter of the actuator 24.

A variety of different operational parameters of the actuator 24 can be monitored as an indication of when the seat member 20 begins moving. In one embodiment, a detector (not shown) detects rotation of the output shaft 24b of the actuator 24. This can be done in a variety of fashions, including monitoring the output of an optical position encoder.

In another embodiment of the invention, the initiation of movement of the output shaft 24b is detected as a change in the operation of the drive motor 24a. For example, the power delivered to the motor can be ramped up from an initial lower power level at a known rate, which rate may be constant or may vary over time. There will be a deviation from the projected curve of the power delivery profile when the drive motor 24a moves from a static state, wherein the output shaft 24b is stationary, and a dynamic state, wherein the output shaft is rotating to move the seat member 20.

Figure 2:
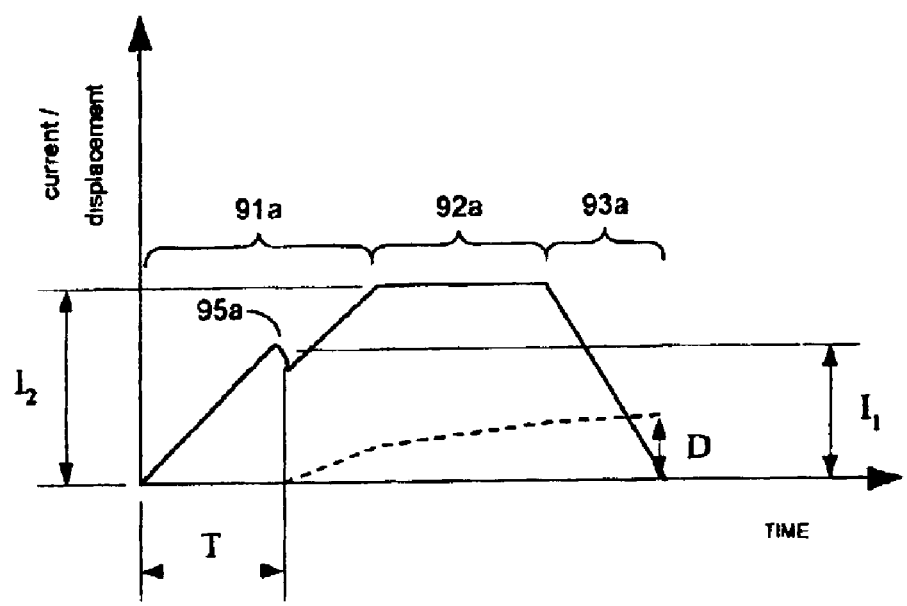
FIG. 2 is an idealized plot illustrating aspects of operation of a seat actuator in the seat system of FIG. 1 with a first passenger in the seat.

FIG. 2 schematically illustrates this principal with an idealized plot of the current delivered to the drive motor 24a as a function of time. The solid line is a plot of the current as a function of time; the dashed line plots the displacement of the seat member 20 from an initial position over the same period of time.

The current curve may be considered as having three distinct phases: a current ramp phase 91a, a constant current phase 92a, and a power down phase 93a. In the current ramp phase 91a, the current is increased from an initial low level, which may be zero, in accordance with a predetermined ramp profile. In the plot of FIG. 2, the ramp profile increases current at a constant rate, leading to an essentially straight-line ramp profile. It should be understood, though, that a straight-line profile is not necessary; in other embodiments, the ramp profile follows a more complex curve.

There is a discontinuity 95a in the ramp profile when the current used to drive the motor 24a deviates from the straight-line ramp profile. This deviation from the ramp profile may be associated with a change in the load on the drive motor 24a which occurs when the output shaft 24b begins to move and, in turn, move the seat member 20. As shown in FIG. 2, the displacement curve, shown in dash lines, moves from the base line, which reflects the initial position of the seat member 20, upwardly from the time T of the discontinuity 95a through the rest of the ramp region 91a.

The controller 54 may be adapted to detect the discontinuity of 95a in the ramp profile as an indication that the output shaft 24b of the actuator 24 has begun moving. In one embodiment, the time T at which the discontinuity 95a occurs is recorded. Since the current is increased at a known rate in accordance with the predetermined ramp profile, the current $I_1$ at which the discontinuity 95a occurs can be determined from the time T from the initiation of the current increase to the time when the actuator begins moving the seat member 20.

The point at which the actuator output shaft 24b begins moving can be used to determine the maximum activation power for the actuator 24. In embodiments wherein the current is increased in accordance with a known ramp profile, the time T between the initiation of the current ramp and the first movement of the output shaft 24b can be used to set the maximum current $I_2$ supplied to the drive motor 24a. The force exerted by the drive motor 24a may increase in a predictable fashion with increasing current delivered to the motor 24a. As a consequence, the current $I_1$ at which the output shaft 24b begins rotating will provide an indication of the force necessary to move the seat member 20. Because the time T and the current $I_1$ vary in a known relationship, the time T between initiation of the current ramp and movement of the output shaft 24b will vary in a predictable fashion with the force necessary to initiate rotation of the output shaft 24b.

Figure 3:
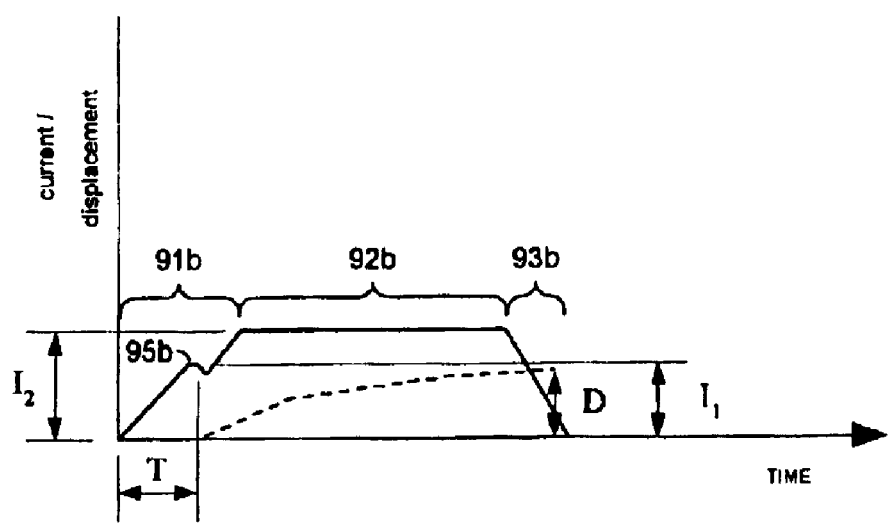
FIG. 3 is an idealized plot similar to FIG. 2, but illustrating operation of the same seat actuator with a second, lighter passenger in the seat.

The force necessary to rotate the output shaft 24b, and hence move the seat member 20, can vary depending on the weight of the passenger occupying the seat 10. This is illustrated by a comparison of FIG. 2, which schematically illustrates a heavier passenger, and FIG. 3, which schematically illustrates the results anticipated with a lighter passenger. In FIG. 3, the current curve has the same three phases, namely a current ramp phase 91b, a constant current phase 92b, and a power down phase 93b. The slope of the ramp in FIG. 3 may be the same as the slope of the ramp in FIG. 2. However, the discontinuity 95b occurs at an initiation current $I_1$ which is less than the initiation current $I_1$ shown in FIG. 2. Since the same ramp profile is used in FIGS. 2 and 3, the time T at which the initiation current $I_1$ is reached is shorter in FIG. 3 than it is in FIG. 2. The shorter time T and lower initiation current $I_1$ indicates that less force is necessary to initiate movement of the actuator shaft 24b. This is an indication that the weight of the seat member 20 and any passenger in the seat 10 is less in the instance of FIG. 3 than in the instance of FIG. 2.

Reducing the activation power (in this example, the current) of the actuator 24 can reduce wear and tear on the components of the actuator 24. Reducing the drive current supplied to the drive motor 24b may, consequently, extend the effective service life of the actuator 24.

Reducing this activation power also reduces the force with which the seat member 20 is urged against the passenger in the seat 10. A child or a more frail passenger is likely to weigh less than a hale adult. By making the force with which the seat member 20 urges against the passenger proportional to the weight of the passenger, the likelihood of inadvertently harming the passenger during movement of the seat member 20 can be reduced.

In accordance with a further embodiment of the invention, therefore, the time T or the initiation current $I_1$ at which the seat member 20 begins moving can be correlated to a maximum activation power for the actuator 24. In this particular example, the time T shown in FIGS. 2 and 3 can be correlated to a maximum current $I_2$ which will be supplied to the drive motor 24a during operation. The relationship between the time T or initiation current $I_1$ and the maximum current $I_2$ may be determined in a variety of fashions. In one embodiment, the relationship between the maximum current $I_2$ and the time T or initiation current $I_1$ can be determined in accordance with a fixed mathematical formula. This mathematical formula may provide for a direct linear relationship between the measured parameter (T or $I_1$) and the maximum current $I_2$, or a more complex function may be more appropriate. The precise relationship between the measured parameter (T or $I_1$, for example) and the maximum activation current $I_2$ will vary depending upon the particular actuator and seat configuration used. If so desired, the appropriate maximum activation current $I_2$ can be determined for a known time T or initiation current $I_1$ from an empirically determined look-up table or the like.

As shown in FIGS. 2 and 3, the drive motor 24a may be operated at the appropriate maximum current $I_2$ during a constant current phase 92a or 92b to move the seat member 20 a displacement distance D. When the desired displacement distance D has been reached, the current to the drive motor 24a may be terminated. In the illustrated embodiment, the current is not immediately terminated. Instead, the current is ramped down in a more gradual fashion in a power down phase 93a. The seat may continue to be displaced during at least part of this power down, so the power down may be initiated before the desired displacement distance D has been reached.

The process outlined above for setting the maximum activation current $I_2$ assumes that the actuator 24 is operated to lift the seat member 20 against the weight of the seat member 20 and any occupant of the seat 10. In another embodiment, the actuator 24 is operated to lower the seat member 20. The relationship between the passenger's weight and the time T or the initiation current $I_1$ required to move the output shaft 24b will vary, but the underlying principles can be employed to collect seat occupancy data by moving the seat member 20 downwardly, instead.

In the preceding embodiments, the initiation time T or initiation current $I_1$ necessary to initiate movement of the actuator 24 and, consequently, the seat member 20, is used to set a maximum current $I_2$ for operation of the actuator 24. In another embodiment of the invention, the initiation time T or initiation current $I_1$ can be used to determine whether the seat is occupied. If the seat is unoccupied, the actuator 24 needs only act against the weight of the seat member 20. The initiation time T and initiation current $I_1$ will, therefore, fall below the range of values expected if the seat is occupied by a passenger. The lower end of this occupancy range may be considered an occupancy threshold. If the time T or current $I_1$ at which the actuator 24 begins to move falls below the occupancy threshold, the seat 10 may be determined to be unoccupied.

If the seat is unoccupied, it may be advantageous to reduce auxiliary power to the seat. This may be accomplished in a variety of fashions. For example, the controller 54 could terminate or limit the power supplied to the power output 76 or auxiliary devices 78, such as entertainment devices or lighting associated with the seat 10. Power to other components of the seat may also be limited or terminated. For example, operation of the other actuators 34 and 44 and the lumbar pump 48 may be temporarily inactivated on the assumption that any control signal requesting movement of these other actuators is the result of an inadvertent depressing of one of the buttons 62 on the user interface 60, given that no passenger is seated in the seat 10.

The preceding discussion focused on setting a maximum activation current $I_2$ for the seat member actuator 24, which is the same actuator used to determine the control parameter (e.g., the time T or current $I_1$) which is used as an indirect indicator of the presence and weight of a passenger in the seat 10. In one embodiment of the invention, operation of one or more of the other actuators 34 and 44 and/or operation of the lumbar pump 48 may also be adjusted in response to the measured, weight-responsive control parameter. For example, as noted above, the time T necessary for the actuator 24 to begin moving can be used to set the maximum activation current $I_2$ for the actuator 24. The same measured value T can also be used to set a maximum activation power for the back actuator 34, the leg rest actuator 44, and the lumbar pump 48. In one embodiment, the same maximum activation current $I_2$ is used for all three of the actuators 24, 34 and 44. In another embodiment, different limits for the back actuator 34 and leg rest actuator 44 are determined from the same measured value T using a separate mathematical formula or lookup table to determine an appropriate maximum activation power specific to each actuator.

Figure 4A:
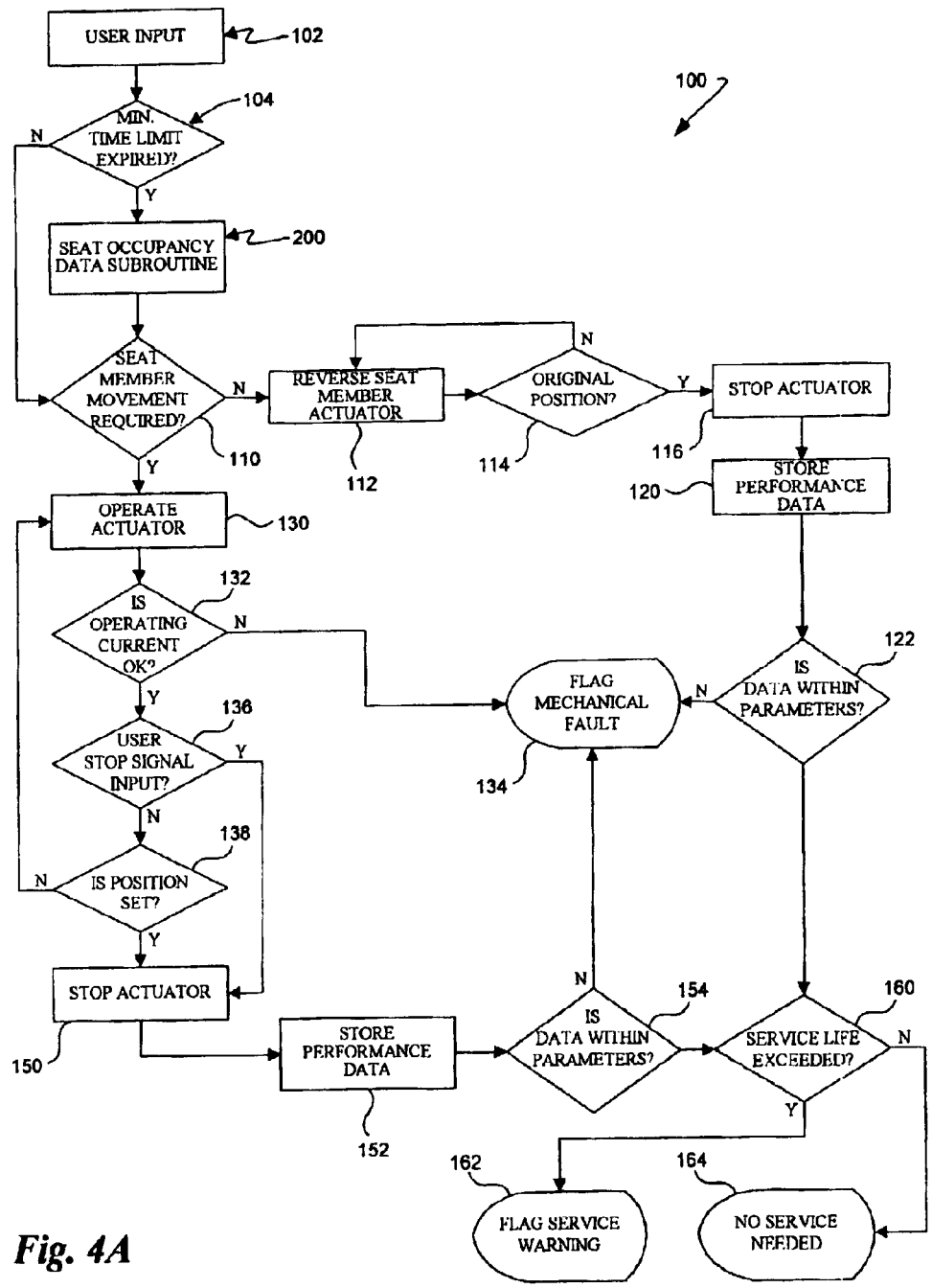
FIGS. 4A and 4B together provide a flowchart schematically illustrating a method of controlling a seat in accordance with another embodiment of the invention.
Figure 4B:
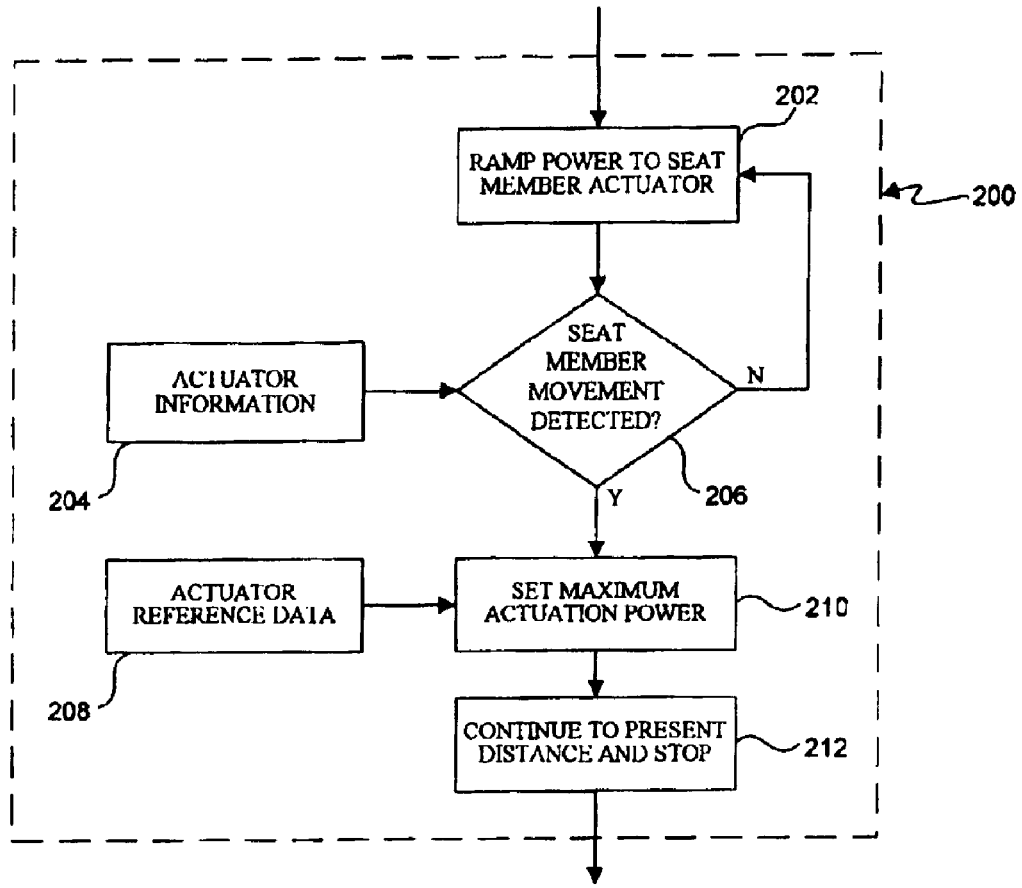

FIGS. 4A–B schematically illustrate one method in accordance with an embodiment of the invention. This particular embodiment employs a single actuator to both determine seat occupancy and measure a value which may vary with the weight of any passenger in the seat. In the following discussion, reference will be made to components of the seat system 1 shown in FIG. 1 and the plots of FIGS. 2 and 3. It should be understood, though, that the method outlined in FIGS. 4A–B can be used with any suitable equipment and need not be limited to the specific seat system 1 illustrated in FIG. 1.

FIG. 4A is an overview of a method in accordance with one embodiment of the invention. FIG. 4B is an example of one suitable seat occupancy data subroutine 200 referred to FIG. 4A. Turning first to FIG. 4B, the seat occupancy data subroutine 200 may start with the step 202 of ramping power to the seat member actuator in accordance with a known ramp profile. This may follow a straight-line ramp profile such as that indicated in the current ramp phase 91a in FIG. 2. As the power to the seat member actuator 24 is ramped up, actuator information 204 will be monitored to detect movement of the seat member 20. If movement of the seat member 20 is not detected in step 206, the power will be further ramped up in step 202. This process will continue until movement of the seat member 20 is detected in step 206. Once movement of the seat member 20 is detected, the maximum actuation power may be set at step 210. As noted above, the maximum actuation power may be set by a predetermined mathematical function, by reference to actuator reference data 208 (e.g., a look-up table of values), or any other suitable fashion.

Once the maximum actuation power is set, the seat occupancy data subroutine may end. In the illustrated embodiment, the actuator will continue in step 212 to a preset distance and stop. This distance is reflected as a distance D in FIGS. 2 and 3. In an alternative embodiment of the invention, the power to the actuator 24 is terminated promptly upon detection of movement of the actuator 24, which may minimize the distance which the seat member 20 travels during the seat occupancy data subroutine 200.

In some embodiments of the invention, the distance which the seat member actuator 24 and the seat member 20 travel, and the time during which the seat member 20 travels, may be reduced to reduce the perceptability of the seat member motion by the occupant of the seat 10. In one embodiment, the seat occupancy data subroutine 200 is completed within 5 seconds, e.g., within about 2 seconds. In another embodiment, the distance which the actuator 24 travels is no greater than 5 millimeters, preferably no more than about 2 millimeters. The distance which the seat member 20 travels will depend on the nature of the relationship between the actuator 24 and movement of the seat member 20. In another embodiment, the distance D which the seat member 20 moves during the seat occupancy data subroutine is no greater than about 2.5 millimeters. In a refinement of this embodiment, the seat member 20 moves no more than about 1 millimeter during the seat occupancy data subroutine 200. It is believed that such distances and time frames will reduce any unintended distraction to the occupant of the seat 10 as a consequence of the seat occupancy data collection process.

In FIG. 4A, the seat occupancy data subroutine 200 is initiated by user input 102, such as by the user depressing a button 62 on the user interface 60. In another embodiment (not shown), the seat occupancy data subroutine can be initiated at a fixed check interval. In one such embodiment, the seat occupancy data subroutine is initiated upon the expiration of a fixed check interval since the last time the subroutine 200 was executed. For example, the check interval may be between about 5–20 minutes, e.g., about 10 minutes. If the seat occupancy data subroutine 200 is initiated by user input, as shown in FIG. 4A, this check interval may be reset upon completion of the process outlined in FIG. 4A.

The user input 102 in FIG. 4A may take a variety of forms. In one example, the user input may comprise a signal from the operator depressing a button requesting movement of the seat member 20 to a different position. The user input 102 need not relate to movement of the same element of the seat 10 which is used to conduct the seat occupancy data subroutine 200. For example, if the user depresses a button 62 to adjust the position of the seat back 30, the seat occupancy data subroutine 200 may be conducted using the seat member actuator 24 before the seat back 30 is moved.

In the embodiment shown in FIG. 4A, a minimum time limit prior to reinitiation of the seat occupancy data subroutine may be established. If the minimum time limit has expired, the seat occupancy data subroutine 200 may be initiated. If it is determined that the minimum time limit has not expired in step 104, the seat occupancy data subroutine 200 can be bypassed. This permits a user to adjust the position of an element of the seat 10 by repeatedly depressing a button 62, for example. So long as the series of button pushes comes within the minimum time limit established for the seat system 1, the relevant actuator 24, 34, 44 or pump 48 can be activated without having to collect the seat occupancy data again.

If the minimum time limit is determined not to have expired in step 104, or if the seat occupancy data subroutine 200 is completed, step 110 will determine whether movement of the seat member 20 is required. By way of example, movement of the seat member 20 may not have been required if the user requested adjustment of only the seat back 30 position, but the actuator 24 of the seat member 20 is used in the seat occupancy data subroutine. If movement of the seat member 20 was not required, the seat member actuator 24 may be reversed at step 112 until it is determined at step 114 that the seat member 20 is back in its original position, i.e., in the position it occupied prior to the seat occupancy data subroutine 200. Once the original position has been reached, the actuator may be stopped at step 116. If movement of another element of the seat, such as seat back 30, has been requested, the relevant actuator, e.g., back actuator 34, may be activated while the seat member 20 is returned to its original position in steps 112–116.

If it is determined in step 110 that movement of the seat member 20 is required, the seat member actuator 24 may be operated at step 130, such as by delivering current under control of the controller 54. The operating current of the seat member actuator 24 may be monitored during operation to ensure that it remains within acceptable parameters. If it is determined at step 132 that the operating current is not within acceptable parameters, a mechanical fault may be flagged at step 134. This mechanical fault may be communicated to the global control system 70 on a real-time or periodic basis or communicated to an external computer 72 during a routine service check.

If the operating current remains within acceptable parameters as determined at step 132, the actuator may continue to operate if no user stop signal is input. This gives a user the option of stopping adjustment of the seat if he changes his mind, for example. If a user stop signal is input at step 136, the actuator may be stopped at step 150. If no such user stop signal is input, a determination may be made at step 138 whether the seat member 20 has been set in the position requested by the user. If not, operation of the actuator 24 may continue at step 130. If the seat member 20 has been set in the desired position, the actuator 24 may be stopped at step 150.

In another embodiment of the invention, the performance data for each of the actuators 24, 34, and 44 may be recorded over time. Any fault in operation of the actuator may be flagged for future reference. In another embodiment, the performance data collected over time for each of the actuators may be used to predict service needs for the seat.

In the embodiment shown in FIG. 4A, the performance monitoring of the seat member actuator 24 is carried out in the context of a larger process which includes the seat occupancy data subroutine 200. In other embodiments of the invention, the actuator performance can be monitored and service needs can be predicted without requiring collection of seat occupancy data. The following discussion will focus on operation of the seat member actuator 24, but it should be understood that much the same process can be utilized in connection with operation of any other actuator (e.g., 34 or 44) or pump in the seat system 1.

During operation of the actuator 24 in steps 130–150, the power level delivered to the actuator drive motor 24b and the length of time during which the actuator 24 is operated can be detected. When the actuator is stopped at step 150, this information can be stored as performance data associated with that movement of the seat member 20. The format of the performance data can take any desired form. For example, the average power level or the maximum power level may be included as one value and the length of time during which the actuator 24 moved can be recorded as another value. Alternatively, the power level and time of operation may be used to calculate a single value for storage as the performance data.

Much the same process can be used to store performance data at step 120 for the process of returning the seat member 20 to the position it occupied prior to the seat occupancy data subroutine 200, as outlined in steps 112–116. The performance data for a full movement of the seat member actuator 24 may include movement of the seat member actuator during the seat occupancy data subroutine 200, as well. When the performance data for a particular movement of the actuator 24 is determined, the data can be analyzed to determine whether it is within acceptable parameters. This may be done prior to, concurrent with, or after storage of the performance data at step 152 or 120. If the data is determined at step 122 or 154 not to fall within normal operating parameters, a mechanical fault may be flagged at step 134, as noted previously.

Even if the data falls outside of normal operating parameters at step 122 or 154, a determination may be made at step 160 whether the expected service life of the actuator 24 has been exceeded. This may be done by looking at the cumulative performance data stored in the memory circuit 56 of the controller 50 and comparing the cumulative data to a preset service life value or expectation. In one embodiment, the collective performance data for the actuator 24 may be combined into a single value which represents the cumulative effects of the sequentially recorded performance data for each individual movement of the actuator 24. If the service life value is determined to be exceeded at step 160, a service warning may be flagged and communicated to the global control system 70 or to an external computer 72 during a routine service check. If the service life is not exceeded at step 160, it may be determined that no service is needed at step 164.

Analyzing performance data in accordance with this embodiment of the invention permits the service needs of the elements of the seat 10 to be predicted. Any predicted service needs or mechanical problems with the elements of the seat 10 can be identified and communicated to a service technician. This permits focused, preventative maintenance of potential problems, reducing unanticipated failures during use.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

What is claimed is:

1. A seat control system for a seat including a seat member, comprising a controller adapted to initiate movement of the seat member with a first actuator, including detecting a control parameter at which the seat member begins moving, and determine that the seat is unoccupied if the control parameter falls outside an occupancy range.

2. A method of controlling a seat, comprising:

moving a seat member of the seat with a first actuator, including detecting a control parameter at which the seat member begins moving; and determining that the seat is unoccupied if the control parameter falls outside an occupancy range.

3. The method of claim 2 further comprising reducing auxiliary power to the seat if the seat is determined to be unoccupied.

4. The method of claim 2 wherein the step of moving the seat member is initiated at expiration of a check interval.

5. The method of claim 2 wherein detecting the control parameter comprises detecting a discontinuity in activation power for the first actuator.

6. The method of claim 2 wherein detecting the control parameter comprises detecting movement of an element of the actuator.

7. The method of claim 2 wherein moving the seat comprises increasing activation power supplied to the first actuator from an initial power level in accordance with a ramp profile.

8. The method of claim 7 wherein detecting the control parameter comprises detecting a deviation of the activation power from the ramp profile.

9. The method of claim 7 wherein detecting the control parameter comprises detecting movement of an element of the actuator.

10. A method of controlling a seat, comprising:

moving a seat member of the seat with a first actuator, including detecting a control parameter at which the seat member begins moving;

correlating the control parameter to an actuator limit; and determining that the seat is unoccupied if the control parameter falls outside an occupancy range.

11. The method of claim 10 further comprising reducing auxiliary power to the seat if the seat is determined to be unoccupied.

12. The method of claim 10 wherein the step of moving the seat member is initiated at expiration of a check interval.

13. A method of controlling a seat, comprising:

increasing activation power supplied to a first actuator from an initial power level in accordance with a ramp profile;

while increasing the activation power, detecting a motion indicator correlated to motion of the first actuator;

correlating the motion indicator to a maximum activation power for the first actuator; and determining that the seat is unoccupied if the maximum activation power is below an occupancy threshold.

14. The method of claim 13 further comprising reducing auxiliary power to the seat if the seat is determined to be unoccupied.

15. The method of claim 13 wherein the step of moving the seat member is initiated at expiration of a check interval.

* * * * *